(12) United States Patent
Takabatake et al.

(10) Patent No.: US 11,782,518 B2
(45) Date of Patent: Oct. 10, 2023

(54) VEHICLE INFORMATION DISPLAY SYSTEM

(71) Applicant: TOYOTA JIDOSHA KABUSHIKI KAISHA, Toyota (JP)

(72) Inventors: Satoaki Takabatake, Nissin (JP); Junji Miyazaki, Nagoya (JP); Koji Kimura, Nagoya (JP); Yuki Yoshida, Toyota (JP); Ryo Ogata, Toyota (JP); Tadashi Morishita, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/385,017

(22) Filed: Jul. 26, 2021

(65) Prior Publication Data
US 2022/0066570 A1 Mar. 3, 2022

(30) Foreign Application Priority Data
Aug. 31, 2020 (JP) .................................. 2020-146389

(51) Int. Cl.
*G06F 3/0482* (2013.01)
*B60W 50/14* (2020.01)
(Continued)

(52) U.S. Cl.
CPC ............ *G06F 3/0202* (2013.01); *B60W 50/14* (2013.01); *B60W 60/005* (2020.02);
(Continued)

(58) Field of Classification Search
CPC .... G06F 3/0202; G06F 3/0482; G06F 3/0481; G06F 3/04842; G06F 3/04892;
(Continued)

(56) References Cited

U.S. PATENT DOCUMENTS 10,372,130 B1 * 8/2019 Kaushansky ......... B60W 50/14
2006/0241818 A1 10/2006 Kumon
(Continued)

FOREIGN PATENT DOCUMENTS

CN 109109781 A 1/2019
CN 110603166 A 12/2019
(Continued)

OTHER PUBLICATIONS

U.S. Appl. No. 17/872,398, filed Jul. 25, 2022 in the name of Keigo Hori, et al.

*Primary Examiner* — Douglas M Wilson
(74) *Attorney, Agent, or Firm* — Oliff PLC (57) ABSTRACT

A vehicle information display system an operation section provided at one side in a vehicle width direction relative to a driver seat, the operation section being structured so as to be operable by a vehicle occupant; and a display section provided at a position that is viewable from the driver seat, a vicinity information display region in which vicinity information of the vehicle being displayed being specified at a central portion of the display section, and a selection option display region being specified at one side in the vehicle width direction of the display section, relative to the vicinity information display region, the selection option display region being selectable by the vehicle occupant operating the operation section.

7 Claims, 5 Drawing Sheets

(51) Int. Cl.
*B60W 60/00* (2020.01)
*B60K 37/06* (2006.01)
*G06F 3/0481* (2022.01)
*G06F 3/04842* (2022.01)
*G06F 3/04892* (2022.01)
*B60W 50/08* (2020.01)
*B60R 1/00* (2022.01)
*G06F 3/02* (2006.01)

(52) U.S. Cl.
CPC ............ *G06F 3/0482* (2013.01); *B60K 37/06* (2013.01); *B60K 2370/11* (2019.05); *B60K 2370/115* (2019.05); *B60K 2370/155* (2019.05); *B60K 2370/1529* (2019.05); *B60K 2370/175* (2019.05); *B60K 2370/178* (2019.05); *B60K 2370/179* (2019.05); *B60K 2370/184* (2019.05); *B60K 2370/782* (2019.05); *B60R 1/00* (2013.01); *B60W 50/08* (2013.01); *B60W 60/001* (2020.02); *B60W 60/0011* (2020.02); *B60W 2050/146* (2013.01); *G06F 3/0481* (2013.01); *G06F 3/04842* (2013.01); *G06F 3/04892* (2013.01); *G06F 2203/04803* (2013.01); *G09G 2380/10* (2013.01)

(58) Field of Classification Search
CPC ........ G06F 2203/04803; B60W 50/14; B60W 60/005; B60W 2050/146; B60W 2556/50; B60W 50/08; B60K 2370/155; B60K 37/06; B60K 2370/11; B60K 2370/115; B60K 2370/1529; B60K 2370/178; B60K 2370/184; B60K 2370/782; B60K 2370/785; B60K 35/00; B60R 1/00; B60R 16/005; B60R 16/02
See application file for complete search history.

(56) References Cited

U.S. PATENT DOCUMENTS

| | | | |
|---|---|---|---|
| 2017/0269704 A1* | 9/2017 | Akita | B60K 35/00 |
| 2018/0373343 A1* | 12/2018 | Hashimoto | B60W 60/0051 |
| 2019/0283770 A1* | 9/2019 | Kubota | B60W 30/18163 |
| 2020/0156662 A1 | 5/2020 | Mimura et al. | |
| 2020/0393263 A1* | 12/2020 | Kleen | B60K 35/00 |
| 2020/0406755 A1* | 12/2020 | Davis | G02F 1/133603 |
| 2021/0131818 A1* | 5/2021 | Yamaguchi | B60K 35/00 |
| 2021/0138903 A1 | 5/2021 | Kozono et al. | |
| 2021/0349592 A1* | 11/2021 | Lemcke | G06F 3/016 |

FOREIGN PATENT DOCUMENTS

| | | |
|---|---|---|
| JP | 2006-298241 A | 11/2006 |
| JP | 2017-039392 A | 2/2017 |
| JP | 2019-006277 A | 1/2019 |
| JP | 2021-075157 A | 5/2021 |
| WO | 2018/220834 A1 | 12/2018 |
| WO | 2019/170387 A1 | 9/2019 |

* cited by examiner

VEHICLE INFORMATION DISPLAY SYSTEM

CROSS-REFERENCE TO RELATED APPLICATION

This application is based on and claims priority under 35 USC 119 from Japanese Patent Application No. 2020-146389 filed on Aug. 31, 2020, the disclosure of which is incorporated by reference herein.

BACKGROUND

Technical Field

The present disclosure relates to an information display system for a vehicle.

Related Art

Japanese Patent Application Laid-Open (JP-A) No. 2019-006277 discloses a vehicle provided with a switch unit to the side of a seat cushion of a driver seat. In the configuration of JP-A No. 2019-006277, when the switch unit is operated, the switch unit accepts input operations during autonomous driving. A display device is provided to the front of the driver seat. Selection options displayed at a display portion by the display device may be selected by operation of the switch unit.

However, a display position of a selection option displayed at the display portion and a position of the switch unit do not correspond. Therefore, when an operation section in addition to the switch unit is provided, a position of this operation section for selecting a selection option is difficult to understand.

SUMMARY

The present disclosure provides a vehicle information display system that, in a configuration in which a selection option displayed at a display section may be selected by operation of an operation section, enables selection of the selection option with little effort.

A vehicle information display system according to a first aspect of the present disclosure includes: an operation section provided at one side in a vehicle width direction relative to a driver seat, the operation section being structured so as to be operable by a vehicle occupant; and a display section provided at a position that is viewable from the driver seat, a vicinity information display region in which vicinity information of the vehicle being displayed being specified at a central portion of the display section, and a selection option display region being specified at one side in the vehicle width direction of the display section, relative to the vicinity information display region, the selection option display region being selectable by the vehicle occupant operating the operation section.

In the vehicle information display system according to the first aspect of the present disclosure, the operation section is provided at the one side relative to the driver seat in the vehicle width direction, and the operation section is structured so as to be operable by a vehicle occupant. The display section is provided at a position that is viewable from the driver seat, and the vicinity information display region in which vicinity information of the vehicle is displayed is specified to be at the central portion of the display section. Therefore, a vehicle occupant sitting on the driver seat may verify vicinity information of the vehicle from the information displayed in the vicinity information display region.

The selection option display region, which is selectable by the vehicle occupant operating the operation section, is provided at the one side in the vehicle width direction relative to the vicinity information display region, that is, at the side relative to the driver seat at which the operation section is provided. Therefore, when a selection option is displayed in the selection option display region, the selection option may be selected by the vehicle occupant intuitively operating the operation section that is provided in the same direction as the selection option display region. For example, when the selection option display region is specified at the vehicle left side of the vicinity information display region, the vehicle occupant may select a selection option by operating the operation section that is provided at the left side. Conversely, when the selection option display region is specified at the vehicle right side of the vicinity information display region, the vehicle occupant may select a selection option by operating the operation section that is provided at the right side. The meaning of the term "one side in the vehicle width direction relative to the driver seat" as used herein is intended to include directions that are offset to the one side in the vehicle width direction relative to the center in the vehicle width direction of the driver seat. Therefore, this term is not limited to structures in which the operation section is provided at an armrest, a center console or the like that is disposed to the side of a seat cushion of the driver seat, but broadly encompasses structures in which the operation section is provided at an instrument panel to the front relative to the driver seat. Further, this term encompasses a structure in which, when the center in the vehicle width direction of the driver seat coincides with the center in the vehicle width direction of a steering wheel, the operation section is provided at the one side in the vehicle width direction relative to the center of the steering wheel in a state in which the steering wheel is not operated.

In a vehicle information display system according to a second aspect of the present disclosure, in the first aspect, a non-selectable image display region may be specified at an opposite side of the vicinity information display region from the side thereof at which the selection option display region is specified, the non-selectable image display region not being selectable in a case in which the vehicle occupant operates the operation section.

In the vehicle information display system according to the second aspect of the present disclosure, the central portion of the display section serves as the vicinity information display region, the one side in the vehicle width direction of the vicinity information display region serves as the selection option display region, and the other side in the vehicle width direction of the vicinity information display region serves as the non-selectable image display region. Therefore, selection options are to be displayed at the same position of the display section, and when a selection option is displayed in the selection option display region, the vehicle occupant may move their hand and perform an operation at the same side as the selection option without thinking. Thus, misoperation may be suppressed.

In a vehicle information display system according to a third aspect of the present disclosure, in the second aspect, the vehicle information display system may be installed in a vehicle that is switchable between autonomous driving and manual driving and, during autonomous driving, a planned action of the vehicle is displayed at the non-selectable image display region.

In the vehicle information display system according to the third aspect of the present disclosure, because planned actions of the vehicle are displayed at the non-selectable image display region during autonomous driving, movements of the vehicle may be understood in advance. The meaning of the term "autonomous driving" as used herein is not limited to a driving mode in which the vehicle runs without the vehicle occupant performing any operations, including steering and acceleration/deceleration, but includes driving modes in which the vehicle occupant performs a predetermined operation to maintain a state of operation of driving assistance functions. That is, the concept of "autonomous driving" broadly encompasses a driving mode in which the vehicle occupant holds the steering wheel to maintain the state of operation of driving assistance functions, a driving mode in which the vehicle occupant keeps their foot on an accelerator pedal to maintain the state of operation of driving assistance functions, and the like.

In a vehicle information display system according to a fourth aspect of the present disclosure, in the third aspect, during autonomous driving, a proposal relating to running of the vehicle may be displayed in a selectable state at the selection option display region.

In the vehicle information display system according to the fourth aspect of the present disclosure, a selection option may be selected without misoperation even when a proposal is displayed in a state during autonomous driving or the like in which the vehicle occupant has taken their hands from the steering wheel and is relaxing.

In a vehicle information display system according to a fifth aspect of the present disclosure, in any one of the first to fourth aspects, the operation section may include a steering switch provided at a steering wheel.

In the vehicle information display system according to the fifth aspect of the present disclosure, when the vehicle occupant operates the steering switch in, for example, a state in which the vehicle occupant is holding the steering wheel, the vehicle occupant moves their hand to the same side as the side at which a selection option is displayed to operate the operation section. Therefore, the selection option may be selected without misoperation.

In a vehicle information display system according to a sixth aspect of the present disclosure, in any one of the first to fourth aspects, the operation section may include a switch provided at one of an armrest or a center console.

In the vehicle information display system according to the sixth aspect of the present disclosure, when the vehicle occupant operates the switch in a state during autonomous driving or the like in which the vehicle occupant has taken their hands from the steering wheel, the vehicle occupant does not need to extend their arm to the steering wheel.

In a vehicle information display system according to a seventh aspect of the present disclosure, in any one of the first to sixth aspects, the display section may include: a first display section on which images are projected by a head-up display device, and a second display section provided at a vehicle front of the driver seat at an instrument panel at a vehicle lower side of the first display section, the vicinity information display region and the selection option display region being specified at both the first display section and the second display section.

In the vehicle information display system according to the seventh aspect of the present disclosure, the selection option display region is displayed at both the first display section and the second display section. Therefore, compared to a configuration in which the selection option display region is specified at only one of the first display section and the second display section, cases of a display of a selection option in the selection option display region not being noticed may be suppressed.

In a vehicle information display system according to an eighth aspect of the present disclosure, in the third aspect or the fourth aspect, a direction display mark and speed marks are displayed at the vicinity information display region, the direction display mark displaying a progress direction of the vehicle at regular intervals during autonomous driving, and the speed marks being displayed superposed with the direction display mark, and a spacing of the speed marks changing in accordance with a speed of the vehicle.

In the vehicle information display system according to the eighth aspect of the present disclosure, movements of the vehicle during autonomous driving may be understood just by seeing the direction display mark and the speed marks.

In a vehicle information display system according to a ninth aspect of the present disclosure, in the eighth aspect, the speed marks are displayed with constant spacings in a case in which a speed of the vehicle is constant, and the speed marks are displayed such that spacings increase in a case in which the vehicle accelerates.

A vehicle information display system according to a tenth aspect of the present disclosure includes: an operation section provided at one side in a vehicle width direction or a vehicle vertical direction, relative to a central portion of a steering wheel, the operation section being structured so as to be operable by a vehicle occupant; and a display section provided at a position that is viewable from a driver seat, a vicinity information display region in which vicinity information of the vehicle being displayed being specified at a central portion of the display section, and a selection option display region being specified at one side in the vehicle width direction or the vehicle vertical direction of the display section, relative to the vicinity information display region, the selection option display region being selectable by the vehicle occupant operating the operation section.

In the vehicle information display system according to the tenth aspect of the present disclosure, a selection option display region, which is selectable by the vehicle occupant operating the operation section, is provided at the one side in the vehicle width direction or the one side in the vehicle vertical direction relative to the vicinity information display region, that is, at the side relative to the driver seat at which the operation section is provided. Therefore, when a selection option is displayed in the selection option display region, the vehicle occupant sitting on the driver seat may select the selection option by intuitively operating the operation section that is provided in the same direction as the selection option display region. For example, when the selection option display region is specified at the vehicle upper side of the vicinity information display region, the vehicle occupant may select a selection option by operating the operation section that is provided at the upper side. Conversely, when the selection option display region is specified at the vehicle lower side of the vicinity information display region, the vehicle occupant may select a selection option by operating the operation section that is provided at the lower side.

The present disclosure provides a vehicle information display system that, in a configuration in which a selection option displayed at a display section may be selected by operation of an operation section, enables selection of the selection option with little effort.

BRIEF DESCRIPTION OF THE DRAWINGS

An exemplary embodiment of the present disclosure will be described in detail based on the following figures, wherein.

DETAILED DESCRIPTION

A vehicle information display system 10 according to an exemplary embodiment is employed in a vehicle 12. The vehicle 12 is described with reference to the drawings. As an example, the vehicle 12 according to the present exemplary embodiment is configured to be switchable between autonomous driving and manual driving.

Figure 1:
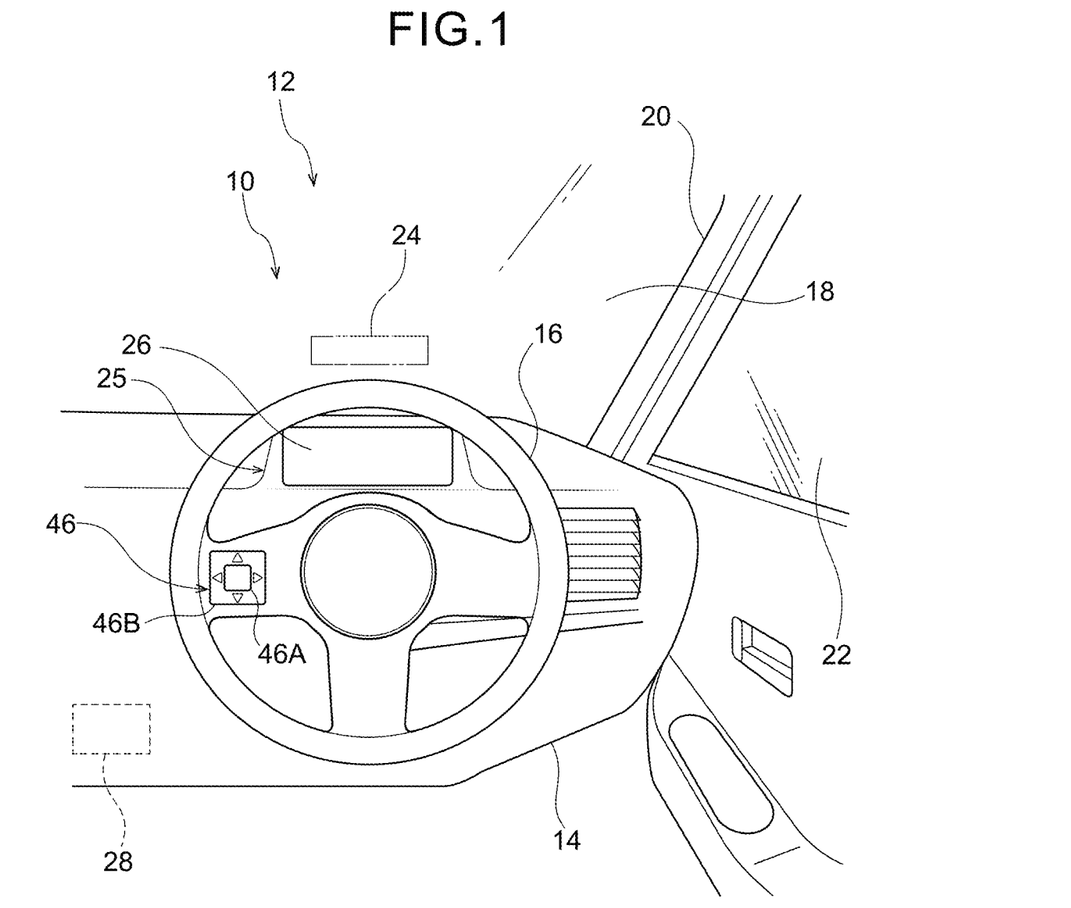
FIG. 1 is a schematic view schematically illustrating a state in which a cabin front portion of a vehicle according to an exemplary embodiment is viewed from the vehicle rear side.

As illustrated in FIG. 1, an instrument panel 14 is provided at a front portion of a cabin interior of the vehicle 12. The instrument panel 14 extends in the vehicle width direction, and a steering wheel 16 is provided at the vehicle right side of the instrument panel 14. That is, the present exemplary embodiment is an example of a right-hand drive car in which the steering wheel 16 is provided at the right side and a driver seat is specified to be at the vehicle right side.

A windshield glass 18 is provided at a front end portion of the instrument panel 14. The windshield glass 18 extends in the vehicle vertical direction and the vehicle width direction, dividing the cabin interior from the cabin exterior.

A vehicle right side end portion of the windshield glass 18 is fixed to a vehicle right side front pillar 20. The front pillar 20 extends in the vehicle vertical direction, and the windshield glass 18 is fixed to a vehicle width direction inner side end portion of the front pillar 20. A front end portion of a front side glass 22 is fixed to a vehicle width direction outer side end portion of the front pillar 20. A vehicle left side end portion of the windshield glass 18 is fixed to a vehicle left side front pillar, which is not illustrated in the drawings.

Figure 2:
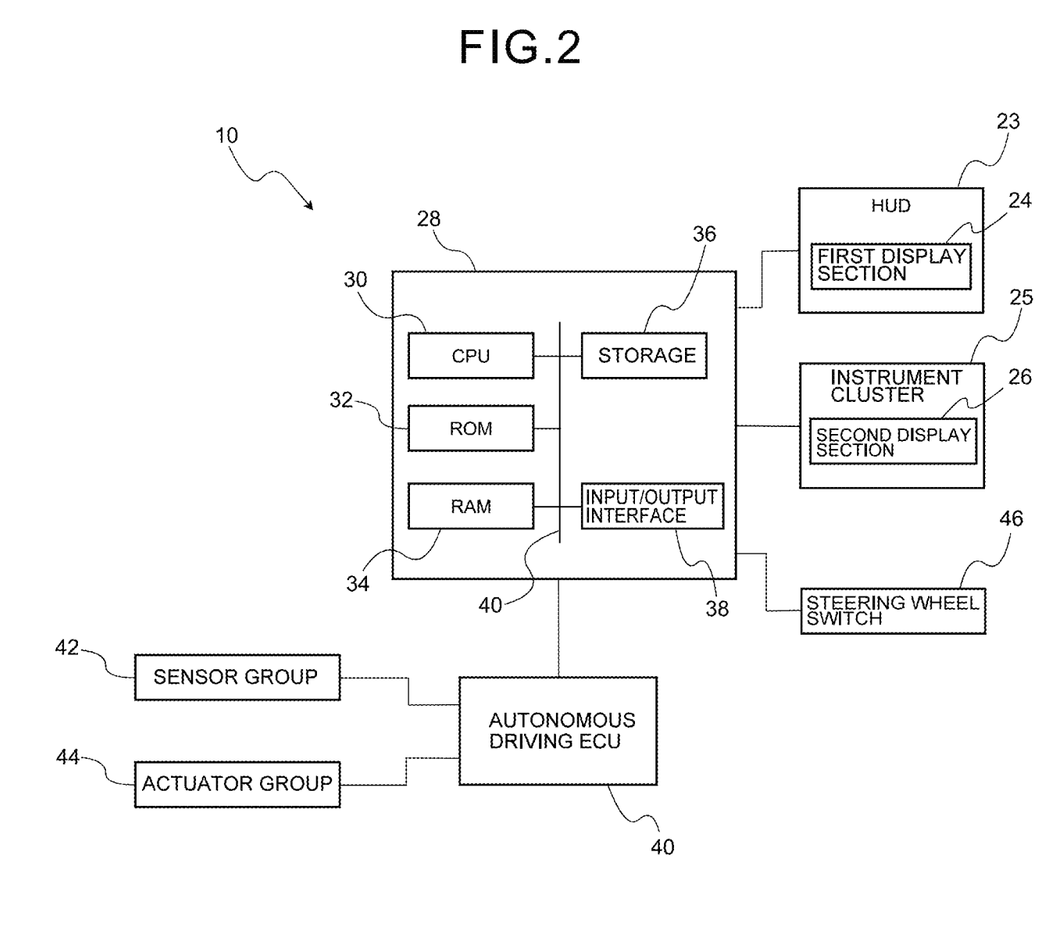
FIG. 2 is a block diagram illustrating hardware structures of the vehicle information display system according to the exemplary embodiment.

A first display section 24 is provided at the windshield glass 18. The first display section 24 is constituted by a projection surface that is projected onto by a head-up display device (HUD) 23, which is illustrated in FIG. 2. Specifically, the head-up display device 23 is provided at the vehicle front side relative to the instrument panel 14, and the head-up display device 23 is structured to project images onto the first display section 24 of the windshield glass 18.

A second display section 26 is provided at the vehicle lower side relative to the first display section 24. The second display section 26 is a display section that is displayed in an instrument cluster 25. The instrument cluster 25 is disposed at the instrument panel 14 to the vehicle front of the driver seat. Thus, the first display section 24 and the second display section 26 are provided at positions that are viewable by a driver.

Hardware Structures of the Vehicle Information Display System 10

As illustrated in FIG. 2, the vehicle information display system 10 according to the present exemplary embodiment includes an electronic control unit (ECU) 28.

The ECU 28 includes a central processing unit (CPU or processor) 30, read-only memory (ROM) 32, random access memory (RAM) 34, storage 36 and an input/output interface 38. These structures are connected to be capable of communicating with one another via an internal bus 39.

The CPU 30 is a central arithmetic processing unit that executes various programs and controls respective parts. That is, the CPU 30 reads a program from the ROM 32 or the storage 36, and executes the program using the RAM 34 as a workspace. The CPU 30 performs control of the structures described above and various kinds of computational processing in accordance with programs recorded in the ROM 32 or the storage 36.

The ROM 32 stores various programs and various kinds of data. The RAM 34 serves as a workspace, temporarily memorizing programs and data. The storage 36 is a non-transitory recording medium structured by a hard disk drive (HDD) or solid state drive (SSD). The storage 36 stores various programs, including an operating system, and various kinds of data. In the present exemplary embodiment, the ROM 32 or the storage 36 stores a display program and the like for implementing display processing. Various input/output devices are connected to the input/output interface 38.

The ECU 28 is connected to an autonomous driving ECU 40. Similarly to the ECU 28, the autonomous driving ECU 40 includes a CPU, ROM, RAM, storage and an input/output interface, which are not illustrated in the drawings.

A sensor group 42 and an actuator group 44 are connected to the autonomous driving ECU 40. The sensor group 42 detects current states of the vehicle. The actuator group 44 controls running of the vehicle. The sensor group 42 includes plural sensors among various sensors, such as cameras, radar, lidar (light detection and ranging or laser imaging detection and ranging), a GPS (global positioning system) sensor and so forth. The cameras image the vicinity of the vehicle. The radar detects distances and directions of objects in the vicinity of the vehicle with electromagnetic waves. The lidar detects distances and directions of objects in the vicinity of the vehicle with laser light. The GPS sensor detects a current position of the vehicle. The sensor group 42 may also include sensors that detect states of vehicle occupants. For example, the sensor group 42 may include biosensors that detect pulse rates, levels of alertness and the like of vehicle occupants.

The actuator group 44 includes acceleration and braking actuators that regulate acceleration and deceleration of the vehicle, and a steering actuator that drives a steering apparatus of the vehicle. The autonomous driving ECU 40 implements autonomous driving of the vehicle by controlling operations of the actuator group 44 in accordance with current states of the vehicle detected by the sensor group 42. A planned route representing a route along which the vehicle plans to run is memorized in a memory section of the autonomous driving ECU 40. The autonomous driving ECU 40 causes the vehicle to run along the planned route memorized in the memory section.

The ECU 28 is connected to the instrument cluster 25, the HUD 23 and a steering switch 46, which serves as an operation section. As illustrated in FIG. 1, the steering switch 46 is provided at the vehicle left side (one side in the vehicle width direction) relative to a central portion of the steering wheel 16 when the steering wheel 16 is at an initial position thereof. As an example in the present exemplary embodiment, the center in the vehicle width direction of the driver seat coincides with the center in the vehicle width direction of the steering wheel 16. Therefore, the steering switch 46 is provided at the vehicle left side relative to the center in the vehicle width direction of the driver seat.

The steering switch 46 according to the present exemplary embodiment includes a set button 46A and a select button 46B, which are operable by a vehicle occupant. The set button 46A is disposed at the middle of the steering switch 46. The vehicle occupant decides on a selection option displayed at the first display section 24 and the second display section 26 by pushing the set button 46A. The select button 46B is formed substantially in a frame shape encircling the set button 46A. The vehicle occupant changes between selection options displayed at the first display section 24 and the second display section 26 by pushing the select button 46B up, down, left and right.

Switches that are not illustrated in the drawings are provided at the vehicle right side relative to the central portion of the steering wheel 16. When operated by the vehicle occupant, these switches switch prefer running assistance functions corresponding to the switches between operation and non-operation.

Display Screens During Manual Driving

Now, an example of display screens at the first display section 24 and the second display section 26 during manual driving is described with reference to FIG. 3A and FIG. 3B.

Figure 3A:
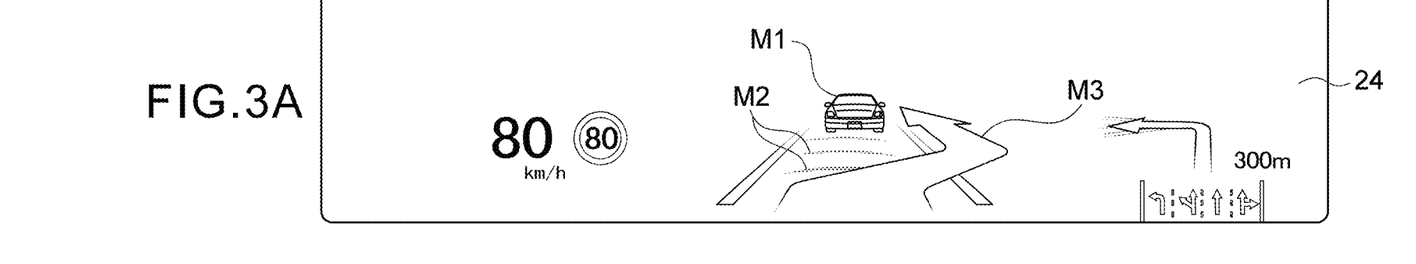
FIG. 3A is a view illustrating an example of a display screen of a first display section during manual driving.

As illustrated in FIG. 3A, during manual driving, vicinity information of the vehicle 12 is displayed at a central portion of the first display section 24. More specifically, a preceding vehicle mark M1 and lane demarcation lines are displayed. The preceding vehicle mark M1 represents a vehicle in front. The lane demarcation lines are at both sides of a lane in which the vehicle 12 is running. A distance from the vehicle in front is calculated on the basis of information from the sensor group 42, and the size of the preceding vehicle mark M1 changes in accordance with the distance from the vehicle in front. When the distance from a vehicle in front is more than a predetermined distance, the preceding vehicle mark M1 is not displayed.

Substantially circular arc-shaped marks M2 in FIG. 3A illustrate a state in which an automatic cruise control function is operating, which is an example of driving assistance. In this example, the vehicle speed is controlled such that the distance from the vehicle in front is constant. A mark M3 representing an arrow in FIG. 3A illustrates a state in which an overtaking function is operating, which is a further example of driving assistance.

An icon relating to a speed limit and the current speed of the vehicle 12 are displayed at the left side of the first display section 24. Navigation system information is displayed at the right side of the first display section 24. As an example in this display screen, an instruction to turn left 300 m ahead of the current position is displayed.

Figure 3B:
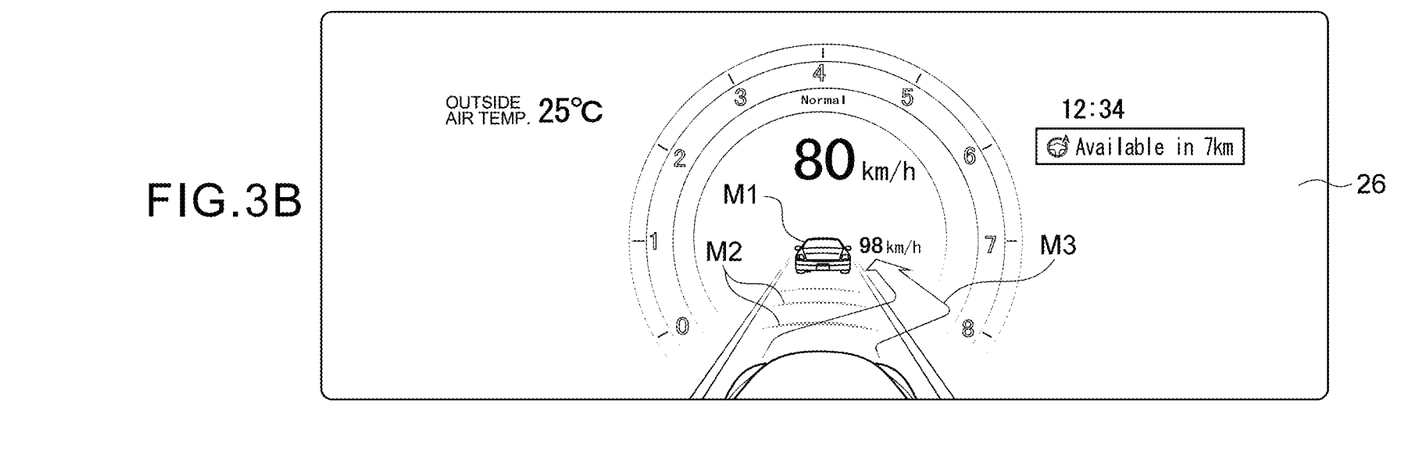
FIG. 3B is a view illustrating an example of a display screen of a second display section during manual driving.

As illustrated in FIG. 3B, during manual driving, vicinity information of the vehicle 12, engine speed and the speed of the vehicle 12 are displayed at a central portion of the second display section 26. In FIG. 3B, information relating to the cruise control and overtaking functions is displayed similarly to FIG. 3A.

Information relating to outside air temperature is displayed at the left side of the second display section 26. The current time and information relating to a distance until autonomous driving is possible are displayed at the right side of the second display section 26. As an example, the display in FIG. 3B illustrates that autonomous driving may be employed at a location 7 km ahead of the current position.

Display Screens During Autonomous Driving

Now, examples of display screens at the first display section 24 and the second display section 26 during autonomous driving are described with reference to FIG. 4A, FIG. 4B, FIG. 5A and FIG. 5B.

Figure 4A:
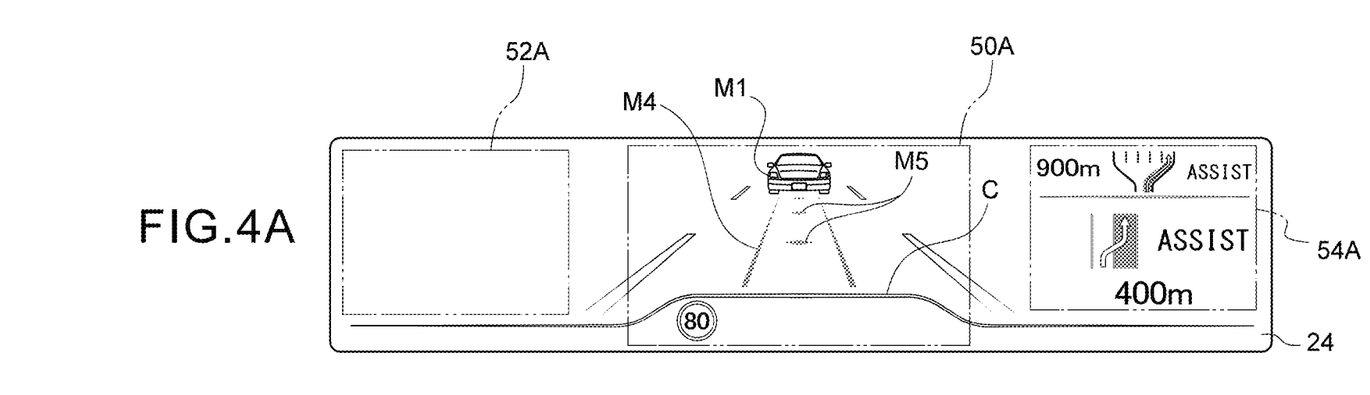
FIG. 4A is a view illustrating an example of a display screen of the first display section during autonomous driving.

As illustrated in FIG. 4A, during autonomous driving, a vicinity information display region 50A is specified at the central portion of the first display section 24. Vicinity information of the vehicle is displayed in the vicinity information display region 50A. The preceding vehicle mark M1 representing a vehicle in front is displayed in the vicinity information display region 50A. Lane demarcation lines at both sides of a lane in which the vehicle 12 is running are also illustrated in the vicinity information display region 50A.

A bump portion C that protrudes to the upper side is displayed at a lower portion of the vicinity information display region 50A. The bump portion C corresponds with a position of the front end of the vehicle 12. That is, the first display section 24 displays the vicinity information of the vehicle 12 in a first person view.

Direction display marks M4 that indicate a progress direction of the vehicle 12 at regular intervals are displayed in the vicinity information display region 50A. The direction display marks M4 extend in substantial strip shapes from the bump portion C toward the preceding vehicle mark M1 of the vehicle in front. Although not illustrated in the drawings, when the vehicle 12 is turning left or right, the direction display marks M4 are displayed in states that curve along the progress direction of the vehicle 12.

Speed marks M5, whose spacings change in accordance with speeds of the vehicle, are displayed superposed with the direction display marks M4. The speed marks M5 are plurally displayed spaced apart along the direction display marks M4. When the speed of the vehicle 12 is constant, the speed marks M5 are displayed with a constant spacing. When the vehicle 12 is accelerating, the speed marks M5 are displayed such that the spacings increase in the progress direction. Conversely, when the vehicle 12 is decelerating, the speed marks M5 are displayed such that the spacings decrease in the progress direction.

A selection option display region 52A is specified at the vehicle left side (the one side in the vehicle width direction) relative to the vicinity information display region 50A. The selection option display region 52A is selectable by the vehicle occupant operating the steering switch 46. Proposals relating to running of the vehicle 12 during autonomous driving are displayed in selectable states in the selection option display region 52A. In FIG. 4A, nothing is displayed in the selection option display region 52A, because there is no proposal for the vehicle occupant.

A non-selectable image display region 54A is specified at the vehicle right side relative to the vicinity information display region 50A, that is, at the opposite side of the vicinity information display region 50A from the side thereof at which the selection option display region 52A is specified. The non-selectable image display region 54A is not selectable even when the vehicle occupant operates the steering switch 46. As an example in the present exemplary embodiment, planned actions of the vehicle 12 during autonomous driving are displayed in the non-selectable image display region 54A. More specifically, major planned actions according to a running plan formulated by the autonomous driving ECU 40 are displayed in the non-selectable image display region 54A. The content of the non-selectable image display region 54A in FIG. 4A illustrates a planned lane change 400 m ahead. The content of the non-selectable image display region 54A also illustrates a planned lane change 900 m ahead.

Figure 4B:
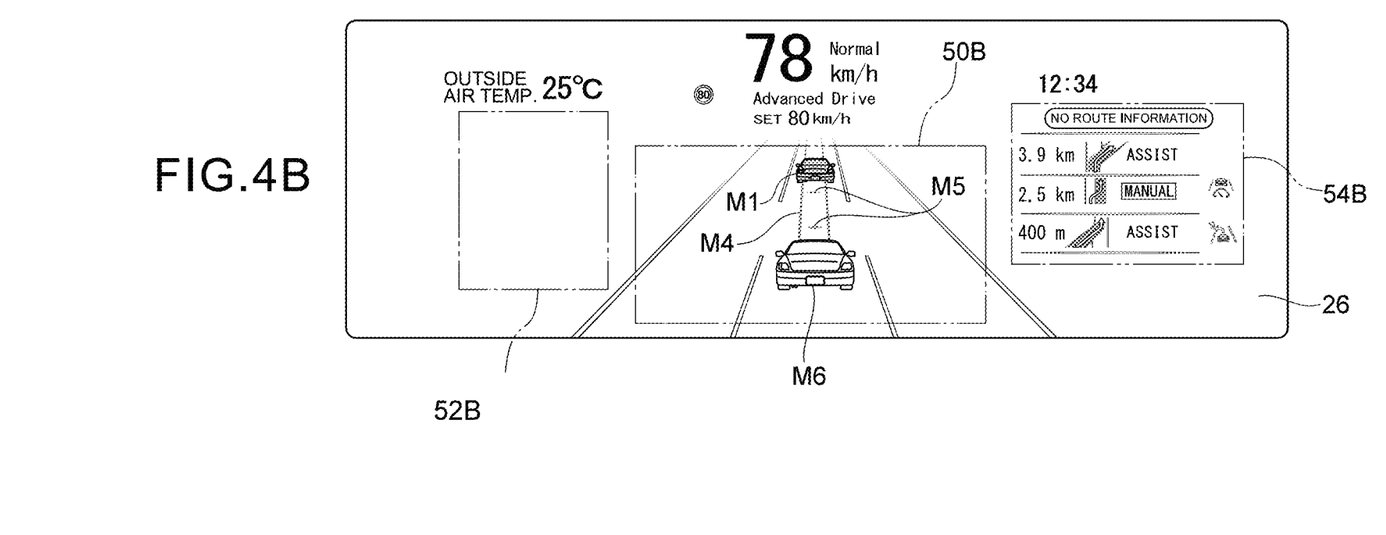
FIG. 4B is a view illustrating an example of a display screen of the second display section during autonomous driving.

As illustrated in FIG. 4B, during autonomous driving, a vicinity information display region 50B is specified at the central portion of the second display section 26. The vicinity information display region 50B displays vicinity information of the vehicle. The preceding vehicle mark M1 representing the vehicle in front, and a present vehicle mark M6 representing the vehicle 12 are displayed in the vicinity information display region 50B. That is, the second display section 26 displays the vicinity information of the vehicle 12 in a third person view. The direction display marks M4 and speed marks M5 are also displayed in the vicinity information display region 50B.

The speed of the vehicle 12, a set speed and the like are displayed in the second display section 26 at the upper side of the vicinity information display region 50B. A selection option display region 52B is specified at the vehicle left side relative to the vicinity information display region 50B, similarly to FIG. 4A. The outside air temperature is displayed at the upper side of the selection option display region 52B. A non-selectable image display region 54B is specified at the vehicle right side relative to the vicinity information display region 50B, similarly to FIG. 4A.

Figure 5A:
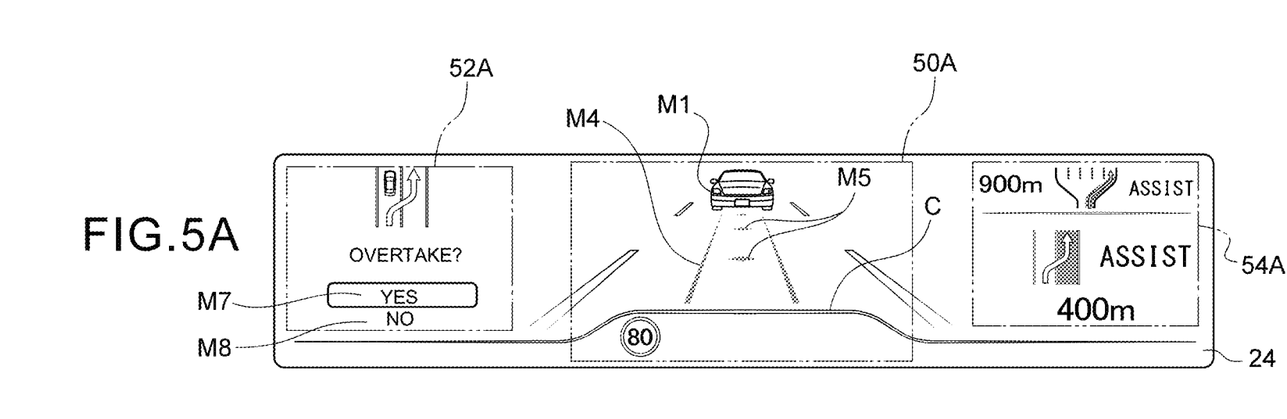
FIG. 5A is a view illustrating another example of a display screen of the first display section during autonomous driving.

As illustrated in FIG. 5A, when there is a proposal for the vehicle occupant, a proposal that relates to running of the vehicle 12 is displayed in the selection option display region 52A in a selectable state. As an example in FIG. 5A, a proposal relating to overtaking of a vehicle in front is displayed in the selection option display region 52A.

More specifically, an image detailing overtaking of the vehicle in front is displayed in an upper portion of the selection option display region 52A, and the proposal to overtake the vehicle in front is displayed as text at the lower side of this image. A selection option M7 to accept the proposal and a selection option M8 to reject the proposal are displayed below the text. In FIG. 5A, the selection option M7 is surrounded by a frame. Thus, a state in which the selection option M7 is to be selected is viewable.

Figure 5B:
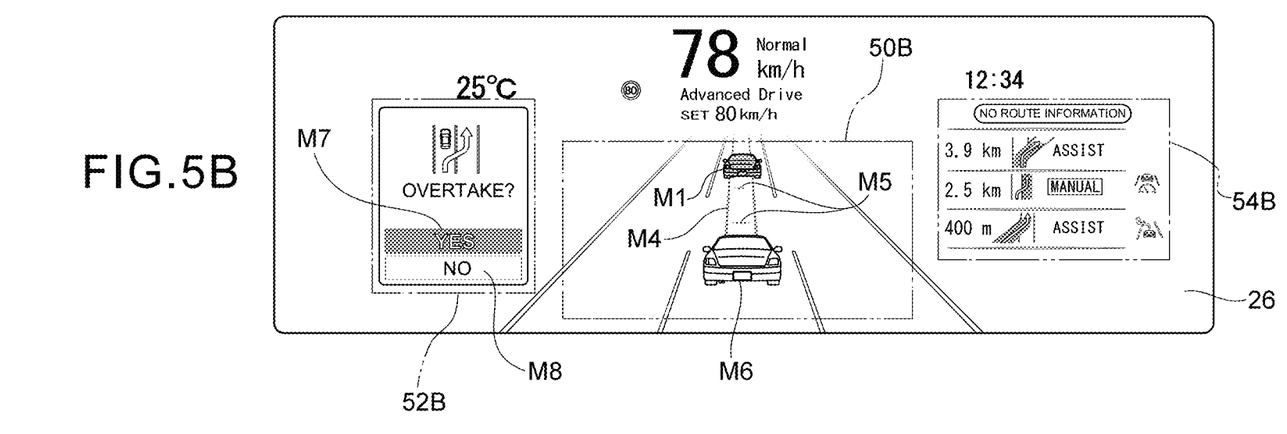
FIG. 5B is a view illustrating another example of a display screen of the second display section during autonomous driving.

As illustrated in FIG. 5B, the content of the display in the selection option display region 52B of the second display section 26 is similar to the first display section 24. In the second display section 26, the selection option M7 is displayed in inverted colors. Thus, the state in which the selection option M7 is to be selected is viewable.

Selection of the selection option M7 or the selection option M8 may be changed by the vehicle occupant pushing an upper portion or lower portion of the select button 46B of the steering switch 46 illustrated in FIG. 1. For example, from the state in FIG. 5A, if the vehicle occupant pushes the lower portion of the select button 46B, the display changes such that the frame surrounding the selection option M7 transfers down to surround the selection option M8. Similarly, from the state in FIG. 5B, when the vehicle occupant pushes the lower portion of the select button 46B, the inversion of the selection option M7 is removed and the display of the selection option M8 is inverted. Similarly to FIG. 5A, the selection option M7 or selection option M8 in FIG. 5B may be displayed surrounded by a frame.

If the vehicle occupant pushes the set button 46A of the steering switch 46 in the state in which the selection option M7 is selected, a signal accepting the proposal is sent to the ECU 28. Correspondingly, the actuator group 44 of the autonomous driving ECU 40 is controlled and the vehicle 12 is caused to run so as to overtake the vehicle in front.

On the other hand, if the vehicle occupant pushes the set button 46A of the steering switch 46 in the state in which the selection option M8 is selected, a signal rejecting the proposal is sent to the ECU 28. In this case, the displays of the proposal displayed at the selection option display region 52A and the selection option display region 52B are erased.

Operation

Operation of the Present Exemplary Embodiment are Described Next.

In the vehicle information display system 10 according to the present exemplary embodiment, the steering switch 46 that is the operation section is provided at the left side relative to the driver seat (the one side in the vehicle width direction). The steering switch 46 is structured to be operable by a vehicle occupant. The first display section 24 and the second display section 26 are provided at positions that are viewable from the driver seat. The vicinity information display regions 50A and 50B in which vicinity information of the vehicle is displayed are specified at the central portions of the first display section 24 and the second display section 26. Therefore, the vehicle occupant sitting on the driver seat may verify vicinity information of the vehicle 12 from the information displayed in the vicinity information display regions 50A and 50B.

The selection option display regions 52A and 52B are specified at the left side relative to the vicinity information display regions 50A and 50B (the one side in the vehicle width direction), which is to say, at the side relative to the driver seat at which the steering switch 46 is provided. The selection option display regions 52A and 52B are selectable by the vehicle occupant operating the steering switch 46. Therefore, when selection options M7 and M8 are displayed in the selection option display regions 52A and 52B, the vehicle occupant may intuitively operate the steering switch 46 that is provided in the same direction as the selection option display regions 52A and 52B to select a selection option M7 or M8. That is, in a configuration in which selection options M7 and M8 displayed at the first display section 24 and the second display section 26 are selectable by operation of an operation section such as the steering switch 46 or the like, the selection options M7 and M8 may be selected without mental effort.

In particular, in the selection option display regions 52A and 52B according to the present exemplary embodiment, proposals relating to running of the vehicle during autonomous driving are displayed in selectable states. Therefore, even when a proposal is displayed in a state during autonomous driving or the like in which the vehicle occupant has taken their hands from the steering wheel 16 and is relaxing, the vehicle occupant may select the selection option M7 or M8 without misoperation.

In the present exemplary embodiment, the right sides of the vicinity information display regions 50A and 50B (the other side in the vehicle width direction) serve as the non-selectable image display regions 54A and 54B. Therefore, the selection options M7 and M8 are always displayed at the left sides of the vicinity information display regions 50A and 50B, and when the selection options M7 and M8 are displayed in the selection option display regions 52A and 52B, the vehicle occupant may move their hand and perform an operation at the same side as the selection option display regions 52A and 52B without thinking. Thus, misoperation may be suppressed.

In the present exemplary embodiment, because planned actions of the vehicle are displayed in the non-selectable image display regions 54A and 54B during autonomous driving, movements of the vehicle may be understood in advance.

In the present exemplary embodiment, the selection option display regions 52A and 52B of the vehicle 12 are specified in both the first display section 24 and the second display section 26. Therefore, compared to a configuration in which the selection option display region 52A or 52B is specified at only one of the first display section 24 and the second display section 26, cases of a display of the selection options M7 and M8 in the selection option display region 52A or 52B not being noticed may be suppressed.

In the present exemplary embodiment, the vicinity information display regions 50A and 50B of the vehicle 12 are specified in both the first display section 24 and the second display section 26. Therefore, for example, in a state in which the vehicle occupant is conducting manual driving, the vehicle occupant may drive while checking the vicinity information display region 50A displayed at the first display section 24. On the other hand, when the vehicle occupant is in a relaxed posture during autonomous driving, although the first display section 24 is harder to see, the vehicle occupant may check the vicinity information display region 50B displayed at the second display section 26.

Above, the vehicle information display system 10 according to the exemplary embodiment has been described, but it will be clear that numerous modes may be embodied within a scope that does not depart from the gist of the present disclosure. For example, in the exemplary embodiment described above, the steering switch 46 serves as the operation section, but this is not limiting. A switch provided at an armrest or a center console may be employed as the operation section. If the selection option display regions 52A and 52B are to be specified at the left sides of the vicinity information display regions 50A and 50B as illustrated in FIG. 5A and FIG. 5B, the switch at the armrest or center console is provided at the left side relative to the driver seat. Conversely, if the selection option display regions 52A and 52B are to be specified at the right sides of the vicinity information display regions 50A and 50B, the switch at the armrest or center console is provided at the right side relative to the driver seat.

In the exemplary embodiment described above, the steering switch 46 is provided at the left side relative to the central portion of the steering wheel 16, but this is not limiting. For example, the steering switch 46 may be provided at the upper-left side or lower-left side relative to the central portion of the steering wheel 16, in which cases the position of the steering switch 46 is still disposed at the vehicle left side by reference to the vehicle width direction center of the driver seat. Thus, the same effects as in the exemplary embodiment described above may be provided.

In the exemplary embodiment described above, a configuration is described in which the selection option display regions 52A and 52B are specified at the left sides of the vicinity information display regions 50A and 50B, but this is not limiting. For example, selection option display regions may be specified at the upper sides of the vicinity information display regions 50A and 50B, in which case the operation section for selecting a selection option displayed in the selection option display regions is provided at the vehicle upper side relative to the central portion of the steering wheel 16. Thus, the same effects as in the exemplary embodiment described above may be provided. Conversely, if the selection option display regions are specified at the lower sides of the vicinity information display regions 50A and 50B, the operation section may be provided at the vehicle lower side relative to the central portion of the steering wheel 16, and thus the same effects as in the exemplary embodiment described above may be provided.

What is claimed is:

1. A vehicle information display system installed in a vehicle that is switchable between autonomous driving and manual driving, the system comprising:
    an operation section provided at one side in a vehicle width direction relative to a driver seat, the operation section being structured so as to be operable by a vehicle occupant; and
    a display section provided at a position that is viewable from the driver seat,
        a vicinity information display region, in which vicinity information of the vehicle is displayed, being specified at a central portion of the display section,
        a selection option display region being specified, relative to the vicinity information display region, at an operation section side of the display section in the vehicle width direction, the selection option display region being selectable by the vehicle occupant operating the operation section, and
        a non-selectable image display region being specified at an opposite side of the vicinity information display region from the side thereof at which the selection option display region is specified, wherein
    during the autonomous driving:
        (i) the selection option display region displays, simultaneously with the vicinity information displayed in the vicinity information display region, a plurality of proposals relating to running of the vehicle during the autonomous driving in selectable states;
        (ii) the non-selectable image display region is not selectable in a case in which the vehicle occupant operates the operation section; and
        (iii) a plurality of planned actions of the vehicle are displayed in sequence at the non-selectable image display region, and
    selection of one of the plurality of proposals by the vehicle occupant during the autonomous driving causes the vehicle to execute a corresponding action without exiting the autonomous driving.

2. The vehicle information display system of claim 1, wherein the operation section includes a steering switch provided at a steering wheel.

3. The vehicle information display system of claim 1, wherein the operation section includes a switch provided at one of an armrest or a center console.

4. The vehicle information display system of claim 1, wherein the display section includes:
    a first display section on which images are projected by a head-up display device, and
    a second display section provided at a vehicle front of the driver seat at an instrument panel at a vehicle lower side of the first display section,
    the vicinity information display region and the selection option display region being specified at both the first display section and the second display section.

5. The vehicle information display system of claim 1, wherein
    a direction display mark and speed marks are displayed at the vicinity information display region,
    the direction display mark displays a progress direction of the vehicle at regular intervals during autonomous driving, the speed marks are displayed superposed with the direction display mark, and a spacing of the speed marks changes in accordance with a speed of the vehicle.

6. The vehicle information display system of claim 5, wherein the speed marks are displayed with constant spacings in a case in which the speed of the vehicle is constant, and the speed marks are displayed such that spacings increase in a case in which the vehicle accelerates.

7. A vehicle information display system comprising:

an operation section provided, relative to a central portion of a steering wheel, at one side in a vehicle width direction or a vehicle vertical direction, the operation section being structured so as to be operable by a vehicle occupant; and a display section provided at a position that is viewable from a driver seat, a vicinity information display region, in which vicinity information of the vehicle is displayed, being specified at a central portion of the display section, a selection option display region being specified, relative to the vicinity information display region, at an operation section side of the display section in the vehicle width direction or the vehicle vertical direction, the selection option display region being selectable by the vehicle occupant operating the operation section, and a non-selectable image display region being specified at an opposite side of the vicinity information display region from the side thereof at which the selection option display region is specified, wherein during autonomous driving:
  (i) the selection option display region displays, simultaneously with the vicinity information displayed in the vicinity information display region, a plurality of proposals relating to running of the vehicle during the autonomous driving in selectable states;
  (ii) the non-selectable image display region is not selectable in a case in which the vehicle occupant operates the operation section; and
  (iii) a plurality of planned actions of the vehicle are displayed in sequence at the non-selectable image display region, and selection of one of the plurality of proposals by the vehicle occupant during the autonomous driving causes the vehicle to execute a corresponding action without exiting the autonomous driving.

* * * * *